(12) United States Patent
Richardson (10) Patent No.: US 9,514,016 B2
(45) Date of Patent: Dec. 6, 2016

(54) APPARATUS SYSTEMS AND METHODS FOR FACILITATING TESTING OF A PLURALITY OF ELECTRONIC DEVICES

(75) Inventor: Jon Richardson, Chamblee, GA (US)

(73) Assignee: EchoStar Technologies L.L.C., Englewood, CO (US)

( * ) Notice: Subject to any disclaimer, the term of this patent is extended or adjusted under 35 U.S.C. 154(b) by 1204 days.

(21) Appl. No.: 13/018,935

(22) Filed: Feb. 1, 2011

(65) Prior Publication Data

US 2012/0197582 A1 Aug. 2, 2012

(51) Int. Cl.
*G06F 11/22* (2006.01)
*G06F 11/273* (2006.01)

(52) U.S. Cl.
CPC ....... *G06F 11/2294* (2013.01); *G06F 11/2733* (2013.01)

(58) Field of Classification Search
USPC .................. 702/108, 117–118, 125
See application file for complete search history.

(56) References Cited

U.S. PATENT DOCUMENTS

| 2002/0177968 | A1* | 11/2002 | Organ et al. ................. 702/118 |
| 2004/0268354 | A1 | 12/2004 | Kanai et al. |
| 2011/0137604 | A1* | 6/2011 | Dasnurkar .................... 702/117 |

* cited by examiner

*Primary Examiner* — Mischita Henson
(74) *Attorney, Agent, or Firm* — Lowe Graham Jones PLLC (57) ABSTRACT

Systems and methods are operable to test a plurality of devices under test (DUTs) communicatively coupled to one of a plurality of switching elements of a DUT controller. An exemplary embodiment identifies a first DUT and a second DUT from among the plurality of DUTs as members of a test group, wherein the first DUT and the second DUT are identified based upon a test schedule defining a plurality of test groupings of members of the plurality of DUTs for concurrent testing; and communicates control instructions to a first switching element coupled to the first DUT and to a second switching element communicatively coupled to the second DUT, wherein the control instructions are configured to actuate the first switching element and the second switching element to communicatively couple the first DUT and the second DUT.

20 Claims, 4 Drawing Sheets

APPARATUS SYSTEMS AND METHODS FOR FACILITATING TESTING OF A PLURALITY OF ELECTRONIC DEVICES

BACKGROUND

Various electronic devices are available on the market to perform a variety of functions. For example, cellular phones are configured for exchanging voice data, image data, or other data with other like, or even dissimilar, electronic devices. As another example, set top boxes, digital video disk (DVD) players, gaming devices, or the like, are configured to communicate media content to a display device, such as a television, a display monitor, a personal computer, or the like.

For any give type of electronic device, there many different manufacturers of such electronic devices that the different manufacturers bring to the marketplace. Further, the same manufacturer may have many different models and variations of that type of electronic device.

Accordingly, for successful marketing to consumers, the manufacturer must be confident that their electronic devices will actually operate as intended with other types of electronic devices, and particularly electronic devices produced by other manufacturers. To facilitate interoperability and compatibility, the various manufacturers of like electronic devices, or electronic devices that share a common technology and/or function, cooperatively develop industry design standards and operating standards that define various requirements to which the electronic devices should be designed to comply with.

For example, a simple plug connector may be identified in a standard that defines requirements for connectors to be used by compatible electronic devices. An example standard is the well known uniform serial bus (USB) connector compliance standards that are used to connect various electronic devices with each other. Further, the individual electrical connectors incorporated into the USB compliant connection devices are specified in the USB connector compliance standards. Thus, when a manufacturer of a personal computer or the like markets their electronic devices with ports configured to receive USB compliant connectors, cables, and/or portable memory devices, the various manufacturers may be ensured that their compliant USB ports will receive other compliant USB connections. Accordingly, if data and/or power is to be exchanged by different electronic devices coupled together using a USB compliant connector, the manufacturers may be ensured that the consumer will be readily able to use their compliant USB connectors and/or compliant USB electronic devices with other compliant USB connectors and electronic devices of other manufacturers.

Before such electronic devices are actually brought to market, such electronic devices are typically tested to ensure actual operating compatibility and interoperability with other electronic devices. Such testing is very important when the tested electronic device is using an untested and/or a developing technology that is intended to operate with other legacy compatible electronic devices. The electronic device testing becomes even more important when a group of different electronic devices are intended to operate with each other using the new, untested technology that is planned for an introduction to the marketplace.

However, testing of various different types of electronic devices produced by different manufacturers is relatively difficult. Accordingly, informal gatherings of the different manufacturers and their electronic devices are used to provide a forum for design testing and interoperability testing of the different electronic devices. These informal gatherings have been referred to as a "PlugTest" or a "PlugFest" in the electronic device industries. The PlugTest or PlugFest events are held at a selected site, on selected dates, and during selected times. Testing is done between pairs of electronic devices. The testing of electronic pairs of devices under test (DUTs) is typically scheduled in blocks of predefined periods of time, such as an hour, half hour, or the like.

However, there are several deficiencies to these PlugTest or PlugFest events. First, the engineers, designers and other personnel from each different manufacturer of the DUTs have to personally attend the PlugTest or PlugFest event. If the personnel complete their scheduled testing before the conclusion of the allocated test period, then the personnel will not be able to move on to another DUT to conduct the next scheduled test. In other situations, the testing may run longer that the allocated test period, and accordingly, will cause a delay to the next group of testing personnel.

Further, sending personnel to a PlugTest or PlugFest event site corresponds to a relatively large loss of manpower productivity to the manufacturer. Also, sending personnel to a PlugTest or PlugFest event site, especially when the site is in another city, results in a high cost of travel that is incurred by the manufacturer.

Further, the DUTs must be transported to the PlugTest or PlugFest event site. Shipping and handling of the DUTs may be expensive. And, damage may occur to the DUTs during shipping from the manufacturer's site to the PlugTest or PlugFest event site.

Also, the PlugTest or PlugFest event is conducted over a specific time duration and at a specific time. The scheduled dates and times of the test event may not be convenient for all manufacturers. For example, some personnel may not be readily available for travel to a remote PlugTest or PlugFest event site on the scheduled dates. Or, a particular electronic device may not be completely finished by the start of the PlugTest or PlugFest event date, and accordingly, may not be scheduled for testing.

Accordingly, there is a need in the arts to mitigate the above-described deficiencies that occur with traditional PlugTest or PlugFest events.

SUMMARY

Systems and methods of testing a plurality of devices under test (DUTs) communicatively coupled to one of a plurality of switching elements of a DUT controller are disclosed. An exemplary embodiment identifies a first DUT and a second DUT from among the plurality of DUTs as members of a test group, wherein the first DUT and the second DUT are identified based upon a test schedule defining a plurality of test groupings of members of the plurality of DUTs for concurrent testing; and communicates control instructions to a first switching element coupled to the first DUT and to a second switching element communicatively coupled to the second DUT, wherein the control instructions are configured to actuate the first switching element and the second switching element to communicatively couple the first DUT and the second DUT.

BRIEF DESCRIPTION OF THE DRAWINGS

Preferred and alternative embodiments are described in detail below with reference to the following drawings.

DETAILED DESCRIPTION

Figure 1:
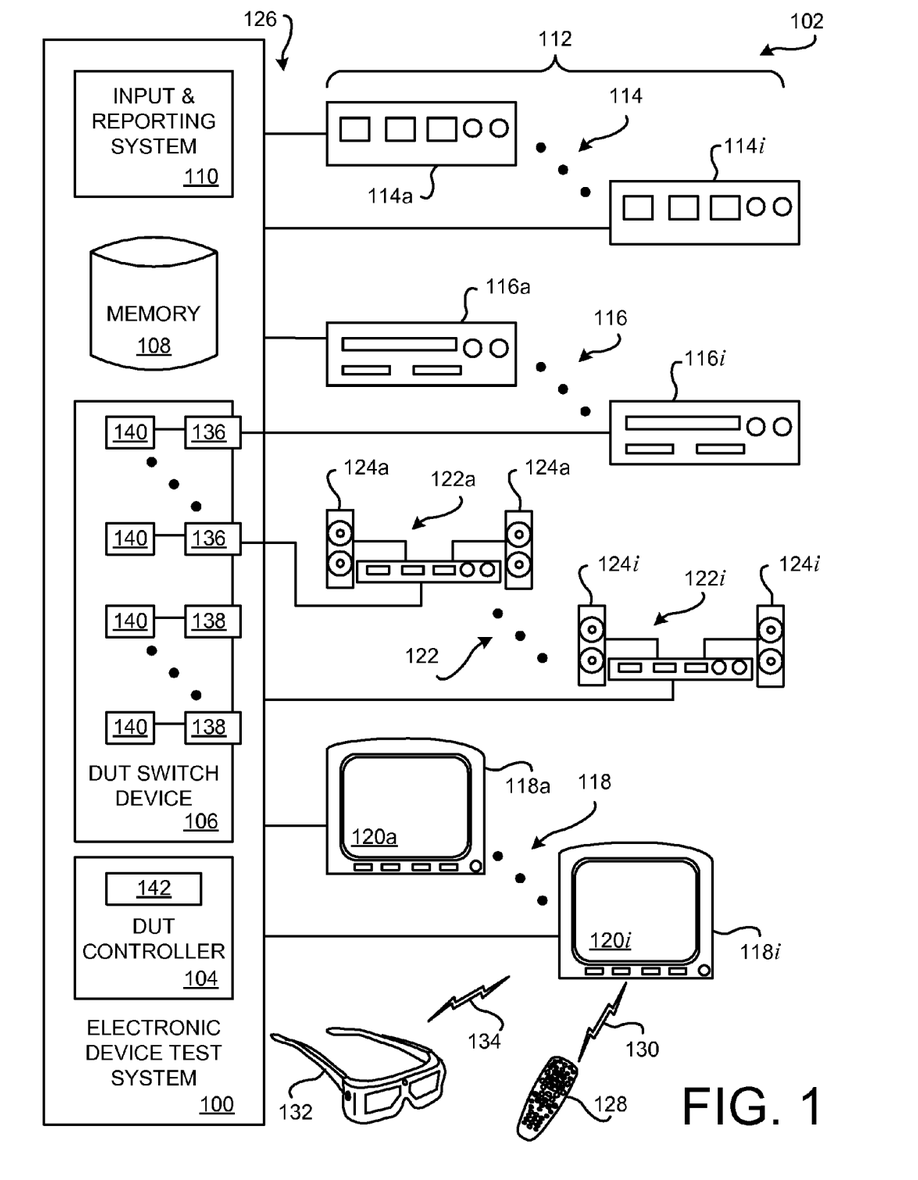
FIG. 1 is a block diagram of an embodiment of an electronic device test system.

FIG. 1 is a block diagram of an embodiment of an electronic device test system 100. The exemplary electronic device test system 100 may reside at a test site 102. The exemplary electronic device test system 100 comprises a device under test (DUT) controller 104, a DUT switch device 106, a memory 108, and a reporting system 110. The exemplary electronic device test system 100 is configured to facilitate design testing, interoperability testing, and/or standards compliance testing of the DUTs 112. The compliance testing process is used to assess design, interoperability, and/or standards compliance compatibility between the DUTs 112.

The testing process occurs over some predefined test duration at the test site 102, referred to as a test event. For example, the test event may occur over a scheduled week or another period of time that permits testing of the electronic devices under test (DUTs) 112. The test event may be referred to as a PlugTest or PlugFest event.

In an exemplary embodiment, a plurality of DUTs 112 are transported to the test site 102 prior to the start of the test event. The test event begins after the various manufactures of the like DUTs 112, and/or DUTs 112 that share a common technology and/or function, are at the test site 102. However, some of the DUTs 112 may arrive at the test site 102 after the start of the test event in view that the embodiments of the electronic device test system 100 are configured to dynamically schedule the testing of the DUTs 112 during the course of the test event based on the real time testing availability of the various DUTs 112. In some situations, a participant may need to leave early or one of the DUTs 112 may need to be removed from the test event. Embodiments of the electronic device test system 100 are also configured to dynamically adjust the test schedule for these situations.

During the test event, different pairings between the plurality of DUTs 112 are scheduled so that each pair of DUTs 112 have an opportunity to test their design, interoperability, and/or standards compliance between each other. Identification of the pairs of DUTs 112 scheduled for testing, and their test schedule, is managed in accordance with a test schedule. The test schedule is maintained by the DUT controller 104 and may be stored in the memory 108.

The test schedule defines a plurality of test durations where pairs and/or groups of DUTs 112 are communicatively coupled together for testing. Each test duration in the test schedule identifies those pairs or groups of DUTs 112 that are to be tested during that particular test duration, specifies the start time (and start date) of the test duration, and specifies the end time (and end date) of the test duration.

At any given time during the test event, and depending upon the number of DUTs participating in the test event, many test durations may be defined in parallel. That is, at any given point in the test event, there may be many different pairs or groups of communicatively coupled DUTs 112 that are concurrently performing tests with each other.

The durations of the different tests may be different. That is, the test durations may be such that the scheduled start times and/or the scheduled end times of the particular tests may be different. Further, if an actual test that is underway concludes before the scheduled end time of that test, the test schedule may be revised to reflect the early test conclusion. Further, the start times of subsequent tests may be adjusted in view of the early concluding test. Thus, if a test concludes early, those DUTs may then begin starting with those next DUTs that they are scheduled to test with in the next scheduled test (assuming those next DUTs are available for testing). Alternatively, a pool of DUTs that are available for immediate testing may be analyzed to identify a next DUT for testing. The test schedule can be revised so that the DUTs of the early concluding test may be communicatively coupled to the identified available next DUTs without delay.

In some situations, an actual test that is underway may not be completed by the scheduled end time of that test. Accordingly, the test schedule may be revised to reflect the delayed test conclusion. Further, the start times of subsequent tests may be adjusted in view of the delayed concluding test. Thus, if a test concludes late, a test start time and/or test end time for those next DUTs may then be rescheduled (assuming those next DUTs will be available for the delayed testing). Alternatively, those next DUTs may be added to the pool of DUTs that are available for immediate testing, and may then scheduled to begin testing with other DUTs. The test schedule can be revised so that the DUTs of the delayed concluding test may be communicatively coupled to the other available next DUTs when their tests are finally concluded. Thus, a delay in a particular test does not disrupt the entire schedule of the test event.

During the test event, many of the DUTs 112 are communicatively coupled to the DUT switch device 106 using a wire-based medium or a wireless medium. Based on the pairings of the DUTs 112 indicated by the test schedule, the DUT controller 104 operates the DUT switch device 106 so as to establish communication connectivity between each pair of DUTs 112 that are under test. Once a pair of DUTs 112 have completed their planned design, interoperability, and compliance testing, the tested DUTs 112 can be decoupled from each other by suitable actuation of the switching elements of the DUT switch device 106.

As the test process proceeds, the DUT controller 104 controls the DUT switch device 106 to automatically communicatively couple the various DUTs 112 in accordance with the test schedule. Accordingly, many pairs of DUTs 112 will have the opportunity to conduct design, interoperability, and compliance testing with each other. Since individual ones of the DUTs 112 are communicatively coupled to the DUT switch device 106, and not directly to other DUTs 112, pairs of DUTs 112 can be communicatively coupled together without the time and effort required to manually disconnect each pair of DUTs 112 when a test concludes, and then to manually connect the DUTs 112 to other DUTs 112 for a subsequent test. Further, there is no need to relocate the equipment to a new locale, such as a different table, test bench, or test lab for subsequent tests.

During each test of a pair of DUTs 112, data or information is exchanged between the paired DUTs 112 over their communication link, established by the DUT switch device 106. A source DUT 112 communicates data and/or information to a sink DUT 112. If the communication is successful between the source DUT 112 and the sink DUT 112, then the paired DUTs 112 are compatible, compliant with standards, and/or have satisfied their design criteria. That is, if the data and/or information is successfully communicated between the paired DUTs 112, then the interoperability and/or operational compatibility between the paired DUTs 112 is confirmed.

Other exemplary tests may include devices initialization, and may include loss and reestablishment of connectivity between pairs or groups of DUTs 112. For example, an exemplary test may establish connectivity between the DUTs 112 to evaluate their initialization with respect to each other. Another exemplary test may disconnect the DUTs 112, then reestablish the connections to assess their ability to correctly reinitialize with each other. Such tests may be conducted by embodiments of the DUT controller 104 that controls the DUT switch device 106 to automatically communicatively couple and/or decouple the various DUTs 112.

A variety of electronic devices may be designated as DUTs 112. Often, the various DUTs 112 share a common technology or a common field of use. For example, a plurality of exemplary DUTs 112 may all be configured for the communication and presentation of media content to consumers. With the advent of high definition media content, electronic devices are in development for communication and presentation of high definition media content currently being produced under the high definition multimedia interface (HDMI) standards. Such technology compliance standards are cooperatively developed by the various manufacturers of HDMI electronic devices and other interested entities so that the HDMI enabled electronic devices are compatible and interoperable with each other.

For example, exemplary HDMI compliant devices may include media devices 114 that are configured to receive high definition media content from one or more sources, process the received high definition media content, and then communicate the processed high definition media content to an electronic presentation device. Exemplary media devices 114 include, but are not limited to, a set top box, a receiver, a personal computer, or the like.

In practice, the high definition media content may be received by the media devices 102 over a cable system, a satellite broadcast system, an over-the-air system, and/or the Internet. During the test event, the media device 114 may be considered as a sink DUT 112 when the media device 114 is receiving high definition media content.

Alternatively, or additionally, the media devices 114 may be configured to communicate the high definition media content to other electronic media devices 116. For example, a plurality of digital video disc (DVD) players may be configured to communicate stored high definition media content to the media devices 114. Such electronic media devices 116 may be considered as source DUTs when communicating the high definition media content to the media devices 102.

The media devices 114 may be configured to communicate the video portion, and optionally the audio portion, of the received high definition media content to one or more visual presentation devices 118. Exemplary visual presentation devices 118 include televisions, display monitors, personal computer or the like that are configured to present at least the video portion of the high definition media content on a display 120.

Alternatively, or additionally, the media devices 114 may be configured to communicate the audio portion of the high definition media content to an audio presentation device 122. Exemplary audio presentation devices 122 include stereos, surround sound systems, or the like that are configured to present the audio portion of the high definition media content on one or more speakers 124.

The plurality of media devices 114, visual presentation devices 118, and/or audio presentation devices 122 are often configured to be communicatively connected together at a consumer's installation site, such as their home or office, using the wire-based connectors 126. Embodiments of the electronic device test system 100 are configured to receive such wire-based connectors 126 from the media devices 114, visual presentation devices 118, and/or audio presentation devices 122 that are being tested. That is, the various DUTs 112 that employ a wire-based communication medium may be communicatively coupled to the DUT switch device 106 (rather than to each other).

Other DUTs 112 may communicate with one or more of the exemplary media devices 114, visual presentation devices 118, and/or audio presentation devices 122 using a suitable wireless medium, such as an infrared (IR) medium or a radio frequency (RF) medium. For example, the exemplary remote control 128 may be configured to communicate directly with the exemplary visual presentation devices 118 using a wireless IR or RF signal 130. Here, the remote control 128 acts as a source device that communicates information to the receiving one of the visual presentation devices 118. During testing, such wireless DUTs 112 may communicate directly with particular ones of the other DUTs 112.

Alternatively, the wireless DUTs 112 may communicate through the DUT switch device 106. The DUT switch device 106 includes a suitable IR and/or RF receiver element that is configured to receive the wireless IR and/or RF signals. The receiving visual presentation devices 118 act as sink DUTs 112 when receiving communications from the remote control 128.

Some DUTs 112 may be configured to receive information from other DUTs 112 acting as sources. For example, the visual presentation devices 118 may be presenting three-dimensional (3-D) high definition media content programming on their respective display 120. A pair of 3-D glasses 132 may be configured to receive the visual presentation of the 3-D formatted video images, in the form of visible light signals 134, and then convert the received visual images into 3-D images viewable by a user of the 3-D glasses 132. Here, the visual presentation device 118 acts as a source DUT 112 that presents the 3-D video format images. The receiving 3-D glasses 132 act as a sink DUT 112 since it is receiving the video format images from the visual presentation device 118.

There may be many different manufacturers producing the various DUTs 112. Further, some manufacturers may produce different models of the media devices 114, visual presentation devices 118, audio presentation devices 122, remote controls 128, and/or 3-D glasses 132. Accordingly, there may be many different types, makes and/or models of DUTs 112 produced by a variety of manufacturers that are to be tested in pairs in a coordinated fashion during the test process.

In an exemplary embodiment, the DUT switch device 106 employs a wire based connector 126. The wire based connector 126 is fitted at its ends with a suitable physical interface device, such as standardized plug connector. Non-limiting examples of physical interface devices include uniform serial bus (USB) connectors, eight position (8P8C) connectors, D-subminiature connectors, spade connectors, clip connectors, RF connectors, or the like. These various connectors are configured to mateably connect with receiving ports residing in the DUTs 112 and the DUT switch device 106. Thus, the DUT switch device 106 has a plurality of different plug type connector ports 136 to facilitate testing among many different types of DUTs 112. Further, the DUT switch device 106 may optionally include IR and/or RF transceivers 138 to communicatively connect to DUTs 112.

Since embodiments of the DUT switch device 106 may have many different types of plug type connector ports 136, the exemplary electronic device test system 100 can be easily reconfigured to conduct other test events on different types of DUTs 112 that are used in other technologies or field of uses. For example, the exemplary electronic device test system 100 illustrated in FIG. 1 is configured to facilitate testing of a plurality of DUTs 112 that are configured for communicating and/or presenting media content. After conclusion of the test event, the electronic device test system 100 may be reconfigured to conduct a test event for a plurality of DUTs 112 that are configured to communicate information using another technology that employs different types of the plug type connector ports 136 and/or the IR or RF transceivers 138. For example, cellular phones and related devices may be brought together to test a Bluetooth or Wi-Fi media system. As yet another example, a plurality of DUTs 112 used in a public telephone switched network system or an Internet system may be brought together to conduct a test event. As another example, a test event may be organized to test a variety of different controllable home appliances, such as, but not limited to, security systems, environmental control system refrigerators, ovens, lights, or the like. Embodiments of the electronic device test system 100 may be configured to support testing of electronic devices in any area of technology.

Embodiments of the DUT switch device 106 may be configured to communicatively couple and pairing of DUTs 112 for testing. The DUT switch device 106 comprises a plurality of switching elements 140 coupled to the plug type connector ports 136, the IR transceivers 138, or the RF transceivers 138. Each switching element 140 is configured to provide connectivity to a DUT 112. In accordance with control instructions received from the DUT controller 104, selected ones of the switching elements 140 are communicatively coupled together, thus establishing connectivity between their respective DUTs 112. The switching elements 140 may comprise firmware, software, or combinations of firmware and software.

Further, some embodiments of the electronic device test system 100 may be configured to employ a plurality of DUT switch devices 106 that are cooperatively operated in a distributed manner. For example, a relatively small test event may use a single DUT switch device 106 that employs a limited number of plug type connector ports 136. If the testing event is relatively larger with a greater number of DUTs 112, multiple DUT switch devices 106 may be used to establish connectivity between the DUTs 112. The plurality of DUT switch devices 106 may be controlled by the DUT controller 104.

In some test scenarios, three or more DUTs 112 may be communicatively coupled together and tested as a group. For example, a consumer may communicatively couple a media device 114 to one or more visual presentation devices 118 and/or audio presentation devices 122, and may include an media device 114, such as an audio visual (AV) receiver, in the path. Accordingly, it may be desirable to test selected groups of media devices 114, visual presentation devices 118, AV receivers, and/or audio presentation devices 122. The DUT controller 104 may configure the DUT switch device 106 so that groups of DUTs 112 are communicatively coupled together for such testing.

For example, during a beginning of first test duration defined in the test schedule, the DUT controller 104 communicates a control signal that causes the switching elements 140 to couple from each other, thereby communicatively coupling the media device 114*a* to the visual presentation device 118*a* via their respective switching elements 140. During this test duration, the media device 114*a*, acting as a source that transmits media content, may be tested with the visual presentation device 118*a*, acting as a sink that receives media content.

At the conclusion of this first test duration, the DUT controller 104 communicates a control signal that causes the switching elements 140 to decouple from each other, thereby decoupling the media device 114*a* and the visual presentation device 118*a*. At the start of a next test duration, and/or if the visual presentation device 118*i* is available for testing, the DUT controller 104 may communicate control signals to the respective switching elements 140 so that the media device 114*a* becomes communicatively coupled to the visual presentation device 118*i*.

Concurrently, during a second test duration defined in the test schedule, the media device 114*i* may be communicatively coupled to the visual presentation device 118*i* via their respective switching elements 140. At the end of this second test duration, which may or may not correspond to the above-described first test duration, the DUT controller 104 communicates a control signal that causes the switching elements 140 to decouple from each other, thereby decoupling the media device 114*i* and the visual presentation device 118*i*. At the start of a next test duration, and/or if the visual presentation device 118*a* is available for testing, the DUT controller 104 may communicate control signals to the respective switching elements 140 so that the media device 114*i* becomes communicatively coupled to the visual presentation device 118*a*.

In the various embodiments, the DUT controller 104 may comprise a plurality of components. Exemplary components include processor systems, memories, connection ports, or the like. In an exemplary embodiment, the DUT controller 104 may be implemented using a personal computer or the like. Any suitable controller device and/or system may be used to implement the DUT controller 104.

During the testing process performed at the test site 102, personnel employed by the various manufacturers perform the various design, interoperability, and/or standards compliance compatibility testing among pairs of the DUTs 112. In an exemplary embodiment, the input and reporting system 110 is configured to provide test result reporting on a real time, or near real time, basis. The test result reporting may be private, wherein the reporting is accessible only to the personnel of the pair of tested DUTs 112 and/or to selected entities. Alternatively, the reporting may be public, wherein the test result reporting is accessible to participants of the test event and/or other interested entities.

The input and reporting system 110 is further configured to receive information pertaining to the tested DUTs 112. For example, prior to the beginning of the test event, each of the participating DUTs 112 are registered with the organizers of the test event. In the various embodiments of the electronic device test system 100, registration information may be stored into the memory 108. Further, technical information pertaining to the DUTs 112 may be provided. Thus, other participants can appreciate the nature and characteristics of registered DUTs 112, and accordingly, may be better able to pick and choose which of their electronic devices that they would like to register as a DUT 112 for that particular test event, and/or which devices from other participants they would like to test with.

The input and reporting system 110 may comprise a variety of components. For example, test result reports may be presented on a display, printed by a printer, or communicated electronically to other electronic devices, such as a personal computer or the like. A computer system with a screen and keyboard may be used to input information pertaining to the DUTs 112. A suitable interface, such as a modem or the like, may be configured to report to and/or to receive information from remote devices.

In some embodiments, the input and reporting system 110 may include a memory media writing and/or reading device configured to store information into the memory media and/or configured to receive stored information from the memory media. For example, a memory stick medium employing a uniform serial bus connector may be used to retrieve and download information, such as information pertaining to a particular DUT 112 and/or various test results. As another non-limiting example, the input and reporting system 110 may include a compact disc (CD) writer and/or reader device.

In the various embodiments, a processor 142 residing in the DUT controller 104 is configured to retrieve computer-readable medium instructions from the memory 108, a computer-readable storage medium. The processor 142 may be any suitable processor, processor system, or even multiple processors cooperatively acting together to perform the various functionality described herein.

Figure 2:
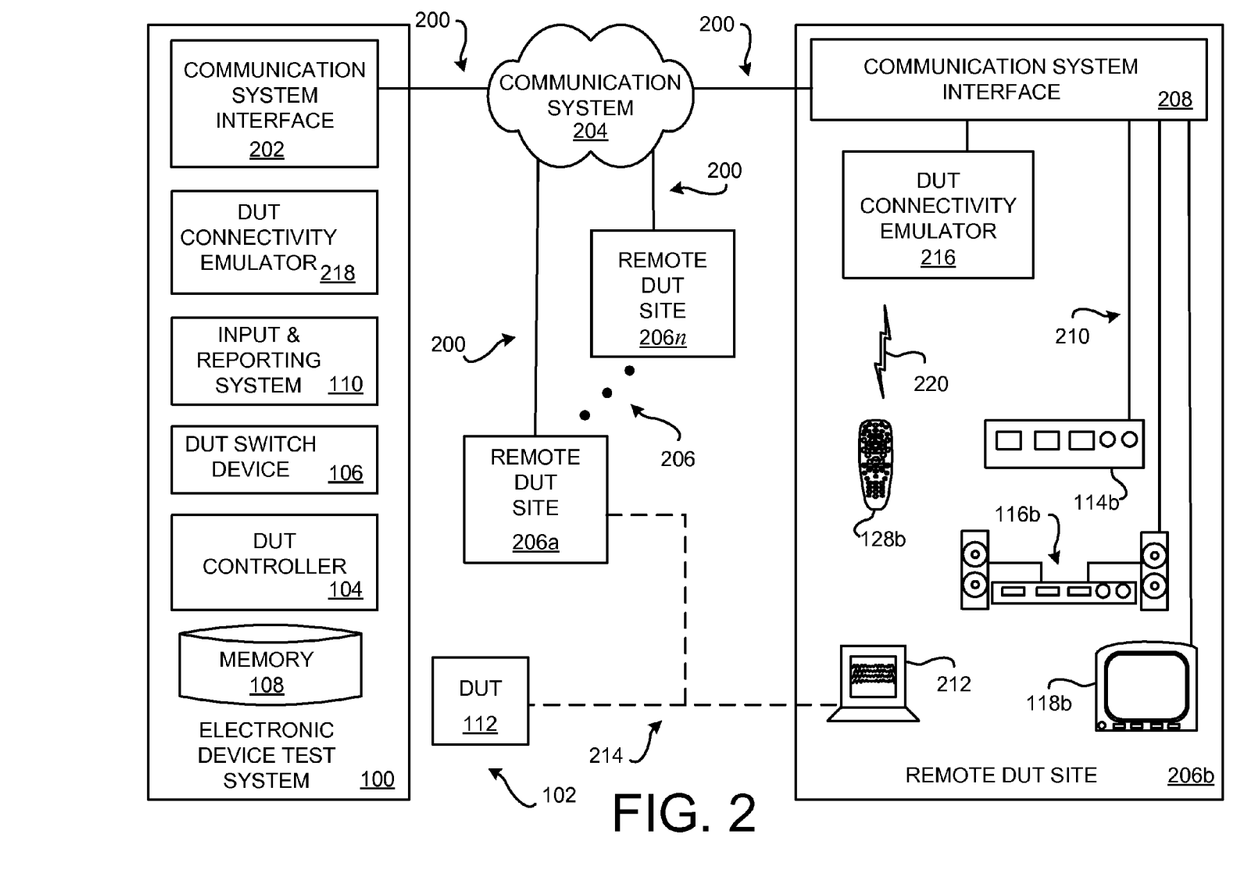
FIG. 2 is a block diagram of an embodiment of an electronic device test system configured to enable remote access by one or more devices under test.

FIG. 2 is a block diagram of an embodiment of an electronic device test system 100 configured to enable remote access by one or more remote DUTs 112. In some situations, it may be difficult or impractical to transport a DUT 112 to the test site 102. Accordingly, embodiments of the electronic device test system 100 may establish communication links 200 at a communication system interface 202 that is configured to communicatively couple to a communication system 204. Accordingly, one or more DUTs 114 located at a remote DUT site 206 may remotely access embodiments of the electronic device test system 100 and participate remotely in the test event. Registration information and/or device information pertaining to the remote DUTs 112 may be saved into the memory 108.

Additionally, or alternatively, it may be difficult or impractical for the personnel who need to participate in the test event to personally attend the test event. For example, the test site 102 may be located in a different country. As another example, work and/or family commitments may preclude the personnel from attending the test event. In such situations, the personnel can operate the remote DUTs 112 from the remote DUT site 206 without having to personally attend the test event.

In an exemplary embodiment, a communication system interface 208 at the remote DUT site 206b is communicatively coupled to the communication system 204 via the established communication links 200. The exemplary DUTs 114b, 116b, and/or 118b at the exemplary remote DUT site 206b are communicatively coupled to the communication system interface 208 via the wire-based connectors 210. In other situations, the exemplary DUTs 112b at the remote DUT site 206b may be communicatively coupled to the communication system interface 208 using a wireless medium.

Accordingly, the communication system interfaces 202, 208, via the communication system 204, provide connectivity between the remote DUTs 112b and the DUT switch device 106. Accordingly, the DUT controller 104 may configure the DUT switch device 106 to provide connectivity between any of the DUTs 112b located at the test site 102b and any of the remote DUTs 112 located at the remote DUT site 206. Further, remote DUTs 112 located at different remote DUT sites 206 may be similarly communicatively coupled together for testing via the DUT switch device 106 and through the communication system 204.

Further, information pertaining to the remote DUTs 112 may be communicated to the electronic device test system 100 and saved into the memory 108. For example, registration information and technical information may be communicated from the remote DUT sites 206 to the electronic device test system 100. Further, a user interface 212 at the remote DUT sites 206 may be communicatively connected to the input and reporting system 110 located at the test site 102. Alternatively, or additionally, user interfaces 212 located at the different remote DUT sites 206 may communicate with each other via the input and reporting system 110, and/or may communicate with each other over alternative communication links 214.

In some situations, it may be practical to transport a DUT 112 to the test site, but impractical to have the test personnel attend the test event. In such situations, the DUT 112 may be transported to the test site and communicatively coupled to the DUT switch device 106. The DUT 112 at the test site 102 may be remotely controlled and monitored by the test personnel from the remote DUT site 206 via the user interface 212. In such situations, the user interface 212 located at the remote DUT site 206 and the DUT 112 located at the test site 102 may be communicatively coupled together via the communication system interfaces 202, 208. Alternatively, or additionally, the remote DUT site 206 and the DUT 112 at the test site 102 may be communicatively coupled together via the communication link 214.

The exemplary communication system 204 is illustrated as a generic communication system. In one embodiment, the communication system 204 comprises the Internet. Accordingly, the communication system interfaces 202, 208 include one or more suitable modems or Internet connection devices.

Alternatively, the communication system 204 may be a telephony system, a radio frequency (RF) wireless system, a microwave communication system, a fiber optics system, an intranet system, a local access network (LAN) system, an Ethernet system, a cable system, a radio frequency system, a cellular system, an infrared system, a satellite system, or a hybrid system comprised of multiple types of communication media. Additionally, embodiments of the electronic device test system 100 may be implemented on other types of communication technologies, such as but not limited to, digital subscriber loop (DSL), X.25, Internet Protocol (IP), Ethernet, Integrated Services Digital Network (ISDN) and asynchronous transfer mode (ATM). Also, embodiments of the electronic device test system 100 may be employed on combination systems having a plurality of segments which employ different formats for each segment employing different technologies on each segment.

In some embodiments, it may not be technically feasible to connect one or more of the DUTs 112 located at a remote DUT site 206 to their respective communication system interface 208. Accordingly, a DUT connectivity emulator 216 may be used to provide a suitable emulated interface between the DUT 112 and its respective communication system interface 208.

For example, the remote control 128b may not be configured to support a wire-based connection to the communication system interface 208. Accordingly, a DUT connectivity emulator 216 may be configured to communicatively couple to the DUT connectivity emulator 216, using a wire-based connection 210 or a suitable wireless connection link. The DUT connectivity emulator 216 may be configured to receive IR or RF signals 218 from the remote control 128b. Communications emitted from the remote control may then be emulated by the DUT connectivity emulator 216, and then communicated to the electronic device test system 100 via the communication system interfaces 202, 208. In some embodiments, a DUT connectivity emulator 218 may be communicatively coupled to, or incorporated with, the DUT switch device 106 so that corresponding IR or RF (or vice versa) signals may be communicated to a DUT 112 being tested at the test site 102.

Figure 3:
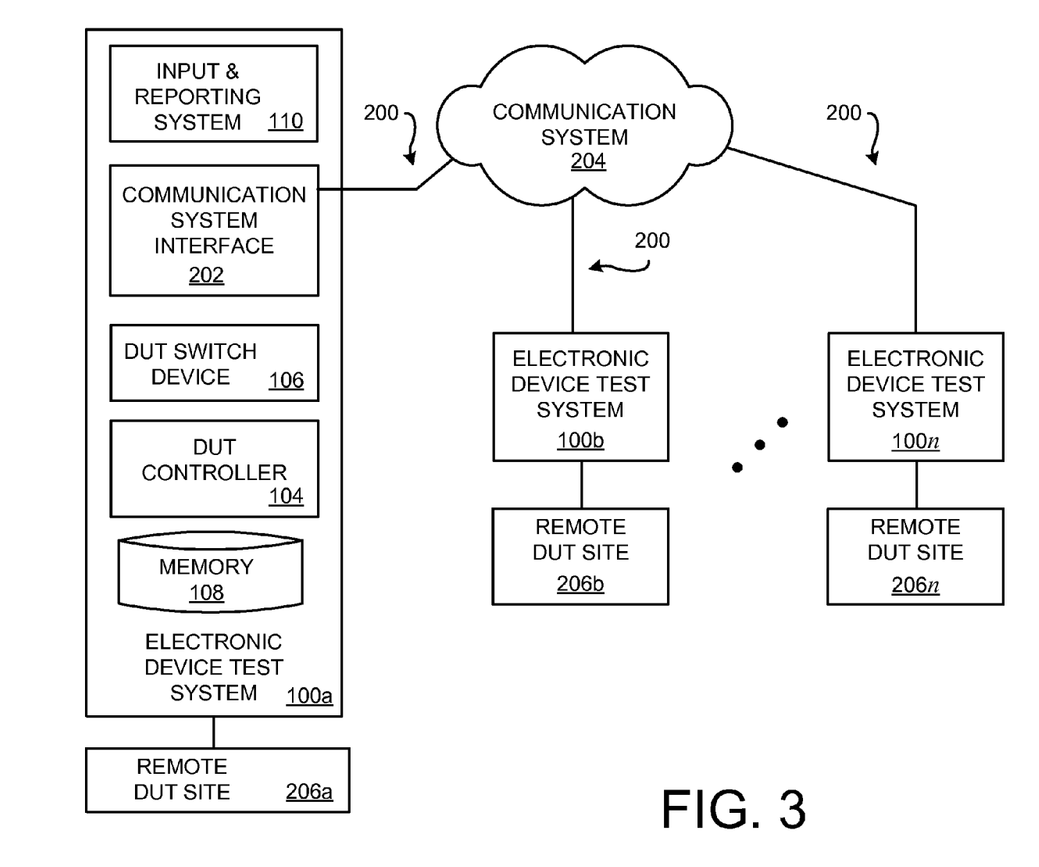
FIG. 3 is a block diagram of a distributed embodiment of the electronic device test system.

FIG. 3 is a block diagram of a distributed embodiment of the electronic device test system 100. In some situations, it may be convenient to locate a plurality of electronic device test system 100 embodiment at different test sites. Alternatively, or additionally, an electronic device test systems 100 may be located at a site owned and/or operated by a particular manufacturer. Accordingly, a plurality of electronic device test systems 100a-100n may be distributed at different locations, such as the exemplary remote DUT sites 206a-206n.

The plurality of distributed electronic device test systems 100a-100n may be communicatively coupled with each other, or the components thereof, by establishing communication links 200 via the communication system 204. Some embodiments of the distributed electronic device test system 100 may omit one or more of the described components. For example, but not limited to, a single DUT controller 104 may be used to control a plurality of DUT switch devices 106 of a plurality of distributed electronic device test systems 100a-100n. As another non-limiting example, a single memory 108, or a selected memory 108, may be used to store the test schedule that is implemented across the plurality of distributed electronic device test systems 100a-100n.

Figure 4:
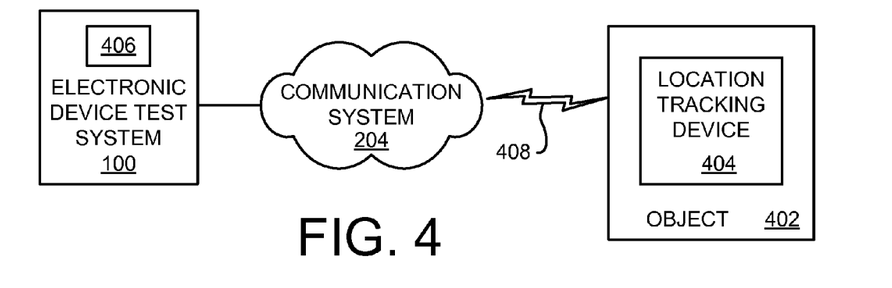
FIG. 4 is a block diagram of an embodiment of an electronic device test system configured to track an object.

FIG. 4 is a block diagram of an embodiment of an electronic device test system 100 configured to track location of an object 402. The object 402 may be a person, one of the DUTs 112, or a cart or the like upon which the DUTs 112 are placed during the test event. During certain times of the test event, it may be desirable to track location of the object 402. Accordingly, a location tracking device 404 may be affixed to or otherwise attached to the object 402. For example, the test event may be an examination, a game, or the like where it is important to track participants, players, DUTs 112, or the like.

An exemplary embodiment of the location tracking device 404 may comprise a global positioning system (GPS) based location tracking device that communicates location information determined by an onboard GPS device. Other location determining systems may be employed by embodiments of the location tracking device 404.

In an exemplary embodiment, the determined location information may be communicated to the electronic device test system 100 via the communication system 204. For example, the location tracking device 404 may include a RF cellular transmitter, a Wi-Fi wireless modem, or the like that is configured to communicatively connect to the communication system 204. The DUT controller 104 at the electronic device test system 100 may then track the location of the object 402 based upon the information received via the communication system 204.

Alternatively, or additionally, the electronic device test system 100 may include a suitable interface 406 that is configured to communicate directly with the location tracking device 404. Wireless signals 408 emitted by the location tracking device 404 may be sensed by the electronic device test system 100 such that the location information may be determined.

Figure 5:
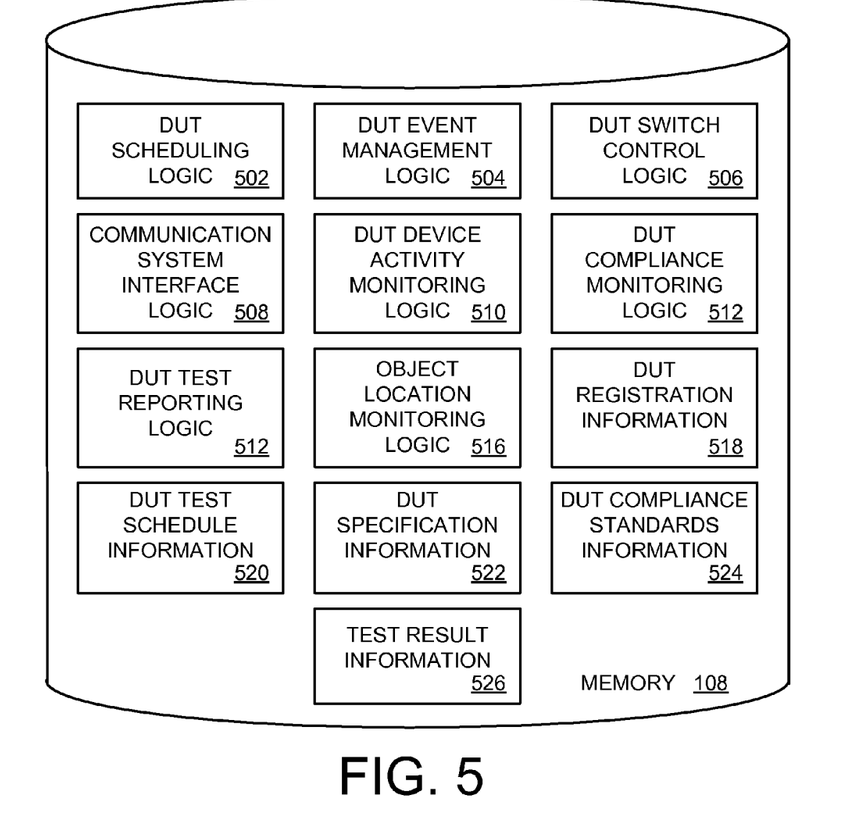
FIG. 5 is a block diagram of components residing in an exemplary memory of an embodiment of an electronic device test system.

FIG. 5 is a block diagram of components residing in an exemplary memory 108 of an embodiment of an electronic device test system 100. The exemplary memory 108 comprises portions for storing DUT scheduling logic 502, DUT event management logic 504, DUT switch control logic 506, communication system interface logic 508, DUT device activity monitoring logic 510, DUT compliance monitoring logic 512, DUT test reporting logic 514, and/or object location monitoring logic 516. The exemplary memory 108 further comprises portions for storing DUT registration information, the DUT test schedule information 520, DUT specification information 522, DUT compliance standards information 524, and/or DUT test result information 526.

The logic 502, 504, 506, 508, 510, 512, 514, and 516 are separately described to facilitate an explanation of the operation of and exemplary embodiment of the electronic device test system 100. In alternative embodiments, the logic 502, 504, 506, 508, 510, 512, 514, and/or 516 may be integrated together and/or may be integrated with other logic not described herein.

The information 518, 520, 522, 524, and 526 are separately described to facilitate an explanation of the operation of and exemplary embodiment of the electronic device test system 100. In alternative embodiments, the information 518, 520, 522, 524, and/or 526 may be integrated together and/or may be integrated with other information not described herein. The information 518, 520, 522, 524, and/or 526 may be stored using any suitable structure or configuration. For example, but not limited to, the information 518, 520, 522, 524, and/or 526 may be structured in a relational data base that is indexed by identification of the DUTs 112 participating in the test event.

The memory 108 may be any suitable computer-readable medium configured to store the logic an/or information that may be retrieved and executed by the DUT controller 104 and/or other devices, such as, but not limited to, the exemplary reporting system 110 (FIGS. 1-3). The memory 108 may be a dedicated memory system, may be part of another component or system, and/or may be a distributed memory system. The memory 108 may also include other logic, modules and/or databases not illustrated or described herein. In some embodiments, the memory 108 may be distributed over different memory media and/or devices. Further, such distributed memory media and/or memory devices may be geographically distributed over different locations. In such distributed environments, the logic and/or information in the distributed memory system may be accessed via the communication system 204.

During a test event, the logic 502, 504, 506, 508, 510, 512, 514, and/or 516, and/or the information 518, 520, 522, 524, and/or 526, is accessed as needed by the DUT controller 104. In some embodiments, a plurality of DUT controllers 104 may be used when the test event is relatively large with many participants, when the test event is distributed over a plurality of geographically dispersed test sites 102, and/or if some of the DUTs 112 are participating in the test event from one or more remote DUT sites 206 (FIG. 2). Accordingly, the plurality of DUT controllers 104 may access the logic 502, 504, 506, 508, 510, 512, 514, and/or 516, and or the information 518, 520, 522, 524, and/or 526, as needed and from wherever such logic and/or information resides. In an exemplary embodiment, the electronic device test system 100 may be implemented as a cluster type server system.

During a test event, pairs of groups of DUTs 112 are tested in accordance with the DUT test schedule. The DUT scheduling logic 502 is configured to manage the DUT test schedule, which is stored in the DUT test schedule information 520. A current test schedule may be accessed by the participants or the organizers of the test event via the input and reporting system 110 and/or the user interface 212 located at the remote DUT site 206 (FIG. 1-2).

In some embodiments, the test schedule information may provide various information of interest to the participants of a particular scheduled test. For example, information describing the technical specifications, features, and/or characteristics of the other paired DUT 112 may be provided in the test schedule, or may be separately provide in another type of report.

Prior to the start of the test event, and/or during the test event, participants provide registration information. The DUT event management logic 504 is configured to receive the registration information, which is stored in the DUT registration information 518. Further, during the registration process, and at other times, information pertaining to the participating DUTs 112 may be provided. Non-limiting examples of the registration information may include information about the manufacturer, general information about participating DUTs 112, technical specification information describing capabilities of the registered DUTs 112, information about the personnel who will be participating in the test event, or other information of interest. The registration information may be shared among the participants or the organizers of the test event via the input and reporting system 110 and/or the user interface 212 located at the remote DUT site 206.

The DUT event management logic 504 may also be configured to receive the information about the participating DUTs 112. The information, typically technical in nature, is stored in the DUT specification information 522. Non-limiting examples of the DUT specification information may include information about connection requirements, supported data communication formats, component specifications, or the like. The information about the participating DUTs 112 may be shared with the participants or the organizers of the test event via the input and reporting system 110 and/or the user interface 212 located at the remote DUT site 206.

During registration, and/or during the test event, participants may indicate which of the participating DUTs 112 they would like to be paired with or grouped with for testing. In an exemplary embodiment, the DUT scheduling logic 502 and the DUT event management logic 504 cooperatively identify pairs or groups of DUTs 112 for testing, and determine a schedule for the identified pairs or groupings of DUTs 112. The generated test schedule may be dynamically changed as the test event progresses. Thus, if some tests are completed ahead of schedule, or if the testing takes longer than anticipated, the test schedule may be dynamically modified. Further, if additional DUTs 112 join the test event after its start, the additional DUTs 112 may be scheduled accordingly.

Further, as the test event proceeds and tests on pairs or groupings of DUTs 112 are underway and/or are completed, the DUT device activity monitoring logic 510 may be configured to monitor the progress of the testing and/or monitor test results. For example, but not limited to, communications between testing DUTs 112 may be monitored at the DUT switch device 106 and/or at the communication system interface 202. Accordingly, early conclusion of a test, or a delayed in the conclusion of a test, may be automatically identified based upon a cessation of the monitored communications. The test schedule may be adjusted accordingly. The adjusted test schedule may then be accessed by the participants or the organizers of the test event via the input and reporting system 110 and/or the user interface 212 located at the remote DUT site 206.

The DUT compliance standards information 524 stores information pertaining to various pertinent industry technical standards. Such technical standards define operating performance expectations of the participating DUTs 112 that should be satisfied during the testing processes. The DUT compliance standards information 524 may be based on adopted industry standards. In some embodiments, the DUT device activity monitoring logic 510 may also be configured to track the various test as they are underway. The DUT compliance monitoring logic 512 may be configured to compare performance of the tested DUTs against the DUT compliance standards 524. For example, a USB connection standard may define characteristics of a particular type on signal that may be communicated over one of the USP connectors of a USB connection. Embodiments may the DUTs 112 communicating over a USB connection, and report on whether the DUTs 112 are communicating compliant signals across that particular USP connector. The results of the comparisons may be used by the DUT test reporting logic 512 to generate test result information pertaining to the test results. Test results may be stored in the DUT test results information 526.

The DUT test reporting logic 512 may be configured to generate various test result reports. The test result reports may be generated on a real time, or near real time basis, and provided to the participants of the test event via the input and reporting system 110 (FIG. 1). Alternatively, or additionally, the test results may be stored for later reporting. Further, selected individual test report information may be analyzed in aggregate to generate summary type reports describing overall performance and compliance type reports that are shared among the participants or the organizers of the test event.

In some embodiments, personnel conducting the testing of pairs or groupings of DUTs 112 may input their observations, via the input and reporting system 110. The received input may be integrated by the DUT test reporting logic 512 for inclusion into the various generated reports.

Some test events may permit participation of remote DUTs 112 located at their respective remote DUT sites 206 (FIG. 2). The communication system interface logic 508 is configured to manage remote connectivity and communications with the remote DUTs 112 and/or other remote electronic devices. For example, the communication system interface logic 508 may be configured to manage that communication system interface 202 that establishes and maintains connections between the electronic device test system 100 and the remote DUT sites 206. The communication system interface logic 508 may be configured to process data received in various communication formats to formats used by the electronic device test system 100.

In an exemplary embodiment, the DUT switch control logic 506 is configured to manage the connectivity between pairs or groupings of DUTs 112 in accordance with the test schedule. Based on the current test schedule, the DUT controller 104 identifies which of the participating DUTs 112 are to be paired or grouped for a particular test. The DUT controller 104, based on execution of the DUT switch control logic 506, generates the control signals which control the switching elements 140 so as to establish connectivity between the pairs or groupings of DUTs 112.

In embodiments configured to track the location of the objects 402 provisioned with a location tracking device 402, the DUT controller 104 uses the object location monitoring logic to determine the location of a tracked object 402 in real time, or in near real time. Information describing the location of the tracked objects 402 may be provided to the participants or the organizers of the test event.

Embodiments of the electronic device test system 100 may have other applications. For example, an embodiment may be configured to perform tests of devices at a testing lab, design lab, or the like. For example, a particular manufacturer of many different, but related, electronic devices may want to test the interoperability and compatibility of their various devices. In some instances, proprietary features and/or technologies may be tested that could not otherwise be tested at a multi-manufacturer test event since the other manufacturers would not have devices employing that particular feature or technology.

It should be emphasized that the above-described embodiments of the exemplary electronic device test system 100 are merely possible examples of implementations of the invention. Many variations and modifications may be made to the above-described embodiments. All such modifications and variations are intended to be included herein within the scope of this disclosure and protected by the following claims.

The invention claimed is:

1. A method for testing a plurality of devices under test (DUTs), comprising:
   coupling a first DUT and a second DUT to an electronic device test system having a DUT controller operatively coupled to a plurality of switching elements and a non-transitory computer readable storage medium;
   identifying and storing the identity of the first DUT and the second DUT in the computer readable storage medium from among the plurality of DUTs as members of a test group, wherein the first DUT and the second DUT are identified based upon a test schedule stored in the computer readable storage medium defining a plurality of test groupings of members of the plurality of DUTs for concurrent testing; and
   communicating control instructions to a first one of the switching elements coupled to the first DUT and to a second one of the switching elements communicatively coupled to the second DUT such that the first and second DUTs are communicatively interconnected, wherein the control instructions are configured to actuate the first switching element and the second switching element to communicatively couple the first DUT and the second DUT.

2. The method of claim 1, further comprising:
   accessing the test schedule residing in the computer-readable storage medium, wherein the test schedule identifies a test duration in the test schedule, and wherein the test duration defines at least a start of the test where the testing between the first DUT and the second DUT is scheduled to begin,
   wherein the first DUT is automatically communicatively coupled to the second DUT at the start of the test duration.

3. The method of claim 2, wherein the test duration further defines at least an end of the test where the testing between the first DUT and the second DUT is scheduled to conclude, wherein the control instructions configured to actuate the first switching element and the second switching element to communicatively couple the first DUT and the second DUT are first control instructions, and further comprising:
   monitoring the test schedule to identify the end of the test duration; and
   communicating second control instructions to the first switching element coupled to the first DUT and to the second switching element communicatively coupled to the second DUT, wherein the second control instructions are configured to actuate the first switching element and the second switching element to communicatively decouple the first DUT and the second DUT.

4. The method of claim 3, further comprising:
   monitoring the test schedule to identify a start of a second test duration, wherein the second test duration defines a duration for testing a third DUT and the first DUT; and
   communicating third control instructions at the start of the second test duration to a third switching element coupled to the third DUT and to the first switching element communicatively coupled to the first DUT, wherein the third control instructions are configured to actuate the third switching element and the first switching element to communicatively couple the third DUT and the first DUT.

5. The method of claim 4, further comprising:
   communicating fourth control instructions at the start of the second test duration to a fourth switching element coupled to a fourth DUT and to the second switching element communicatively coupled to the second DUT, wherein the fourth control instructions are configured to actuate the fourth switching element and the first switching element to communicatively couple the fourth DUT and the second DUT.

6. The method of claim 1, wherein the second DUT is a remote DUT located at a remote DUT site, wherein the first DUT is a local DUT located at a test site, and further comprising:
   establishing a first communication link between a first communication system interface that is communicatively coupled to the remote DUT and a communication system; and
   establishing a second communication link between a second communication system interface that is communicatively coupled to the DUT controller and the communication system,
   wherein the control instructions further establish the first and the second communication links between the remote DUT and the local DUT.

7. The method of claim 1, wherein communicating the control instructions further comprises:
   communicating the control instructions to a third switching element coupled to a third DUT,
   wherein the control instructions communicatively couple the third switching element to at least one of the first switching element and the second switching element, and
   wherein the third DUT is communicatively coupled to at least one of the first DUT and the second DUT.

8. The method of claim 1, further comprising:
   monitoring location of a location tracking device affixed to the first DUT; and
   determining an end of the testing between the first DUT and the second DUT in response to a change in location of the location tracking device.

9. A method for testing a plurality of devices under test (DUTs), comprising:

coupling a first DUT and a second DUT to an electronic device test system having a DUT controller operatively coupled to a plurality of switching elements and a non-transitory computer readable storage medium;

identifying and storing the identity of the first DUT and the second DUT in the computer readable storage medium from among the plurality of DUTs as members of a test group, wherein the first DUT and the second DUT are identified based upon a test schedule stored in the computer readable storage medium defining a plurality of test groupings of members of the plurality of DUTs for concurrent testing; and communicating control instructions to a first one of the switching elements coupled to the first DUT and to a second one of the switching elements communicatively coupled to the second DUT such that the first and second DUTs are communicatively interconnected, wherein the control instructions are configured to actuate the first switching element and the second switching element to communicatively couple the first DUT and the second DUT, and wherein the control instructions communicated to the first switching element and the second switching element configured to actuate the first DUT and the second DUT are first control instructions, and further comprising:

monitoring communications between the first DUT and the second DUT during testing;

identifying a conclusion of the testing between the first DUT and the second DUT in response to a cessation in the monitored communications; and communicating second control instructions to the first switching element coupled to the first DUT and to the second switching element communicatively coupled to the second DUT in response to identifying the conclusion of the testing between the first DUT and the second DUT, wherein the second control instructions are configured to actuate the first switching element and the second switching element to communicatively decouple the first DUT and the second DUT.

10. The method of claim 9, where in response to communicatively decoupling the first switching element and the second switching element, and further comprising:

communicating third control instructions to a third switching element coupled to a third DUT and to the first switching element communicatively coupled to the first DUT, wherein the third control instructions are configured to actuate the third switching element and the first switching element to communicatively couple the third DUT and the first DUT.

11. The method of claim 9, where in response to communicatively decoupling the first switching element and the second switching element, the method further comprising:

accessing the test schedule to identify a third DUT that is not currently under test with others of the plurality of DUTs; and communicating third control instructions to a third switching element coupled to the identified third DUT and to the first switching element communicatively coupled to the first DUT, wherein the third control instructions are configured to actuate the third switching element and the first switching element to communicatively couple the identified third DUT and the first DUT.

12. The method of claim 1, further comprising:

updating the test schedule residing in the computer-readable storage medium, wherein the updated test schedule identifies testing of the identified third DUT and the first DUT, and wherein the updated test schedule identifies completion of the testing of the first DUT and the second DUT.

13. An electronic device test system, comprising:

a device under test (DUT) switch device configured to communicatively couple together at least a first grouping of devices under test (DUTs) during a first test duration, and configured to communicatively couple together at least a second grouping of DUTs during a second test duration;

a non-transitory memory configured to store a test schedule, wherein the test schedule defines at least a start time and an end time of the first test duration, and defines a start time and an end time of the second test duration, defines identities of the first grouping of DUTs, and defines identities of the second grouping of DUTs; and a DUT controller controllably coupled to the DUT switch device and communicatively coupled to the memory, wherein the DUT controller is configured to:

generate first control signals configured to actuate the DUT switch device to establish communicative connectivity between the first grouping of DUTs at the start time of the first test duration;

generate second control signals configured to actuate the DUT switch device to establish communicative connectivity between the second grouping of DUTs at the start time of the second test duration;

generate third control signals configured to actuate the DUT switch device to decouple the connectivity between the first grouping of DUTs at the end time of the first test duration; and generate fourth control signals configured to actuate the DUT switch device to decouple the connectivity between the second grouping of DUTs at the end time of the second test duration.

14. The electronic device test system of claim 13, further comprising:

a communication system interface communicatively coupled to the DUT switch device, and configured to establish a communication link to a remote DUT that is a member of the first grouping of DUTs, wherein the first control signals from the DUT controller are configured to generate fifth control signals to the communication system interface to establish the communication link between the communication system interface and the remote DUT via a communication system, and wherein the first control signals are configured to establish connectivity between the remote DUT and at least one of the other DUTs of the first grouping of DUTs at the start time of the first test duration.

15. The electronic device test system of claim 13, wherein the DUT switch device comprises:

a plurality of connector ports, wherein each one of the connector ports is configured to receive a connector that is communicatively coupleable to one of a plurality of DUTs; and a plurality of switching elements, wherein each one of the switching elements is communicatively coupled to one of the connector ports, and wherein the plurality of switching elements are configured to be selectively coupled to each other in accordance with the first control signals and the second control signals.

16. The electronic device test system of claim 15, further comprising:

at least one transceiver configured to receive at least one of a wireless infrared (IR) signal and a radio frequency (RF) signal that is communicated by one of the plurality of DUTs in accordance with at least the first control signals, wherein the DUT communicating the at least one wireless IR and RF signal is a member of the first grouping of DUTs.

17. A non-transitory computer-readable storage medium containing instructions configured to control a processor residing in a device under test (DUT) controller operating in a test event environment, the DUT controller configured to control connectivity between a plurality of selected devices under test (DUTs) by controlling connections between the selected DUTs, the instructions configured when executed, to perform a method comprising:

identifying a source DUT and a sink DUT from among the plurality of DUTs communicatively coupled to a plurality of switching elements, wherein each of the plurality of DUTs are each communicatively coupled to one of the plurality of switching elements of the DUT controller;

storing an identity of the source DUT and an identity of the sink DUT in the computer-readable storage medium; and communicating control instructions to a first switching element coupled to the source DUT and to a second switching element communicatively coupled to the sink DUT, wherein the control instructions are configured to actuate the first switching element and the second switching element to communicatively couple the source DUT and the sink DUT such that the source DUT and the sink DUT are communicatively interconnected.

18. The computer-readable storage medium of claim 17, wherein the method further comprises:

accessing a test schedule residing in the computer-readable storage medium, wherein the test schedule identifies a test duration in the test schedule, and wherein the test duration defines at least a start of the test where the testing between the source DUT and the sink DUT is scheduled to begin, wherein the source DUT is automatically communicatively coupled to the sink DUT at the start of the test duration.

19. The computer-readable storage medium of claim 18, wherein the test duration further defines at least an end of the test where the testing between the source DUT and the sink DUT is scheduled to conclude, wherein the control instructions communicated to the first switching element and the second switching element to communicatively couple the source DUT and the sink DUT are first control instructions, and wherein the method further comprises:

monitoring the test schedule to identify the end of the test duration; and communicating second control instructions to the first switching element coupled to the source DUT and to the second switching element communicatively coupled to the sink DUT, wherein the second control instructions communicatively are configured to actuate the first switching element and the second switching element to communicatively decouple the source DUT and the sink DUT.

20. The computer-readable storage medium of claim 19, wherein after communicating the second control instructions, the method further comprises:

accessing the test schedule to identify an available DUT that is not currently under test with others of the plurality of DUTs; and communicating third control instructions to a third switching element coupled to the identified available DUT and to the first switching element communicatively coupled to the source DUT, wherein the third control instructions are configured to actuate the third switching element and the first switching element to communicatively couple the identified available DUT and the source DUT.

* * * * *